United States Patent [19]

Ohe et al.

[11] Patent Number: 4,645,025
[45] Date of Patent: Feb. 24, 1987

[54] STEERING APPARATUS FOR VEHICLE

[75] Inventors: Takeshi Ohe; Tadaaki Fujii; Ichiro Koike, all of Saitama, Japan

[73] Assignee: Jidosha Kiki Co., Ltd., Tokyo, Japan

[21] Appl. No.: 835,108

[22] Filed: Feb. 28, 1986

[30] Foreign Application Priority Data

Mar. 6, 1985 [JP] Japan .................................. 60-42790

[51] Int. Cl.$^4$ .............................................. B62D 5/06
[52] U.S. Cl. .................................. 180/79.1; 180/140; 180/142
[58] Field of Search .................... 180/79.1, 142, 140

[56] References Cited

U.S. PATENT DOCUMENTS 4,412,594 11/1983 Furukawa et al. ................. 180/142
4,418,780 12/1983 Ito et al. ............................. 180/79.1

OTHER PUBLICATIONS

Japanese Patent Publication No. sho 59-26364.
Japanese Patent Publication No. sho 59-81261.

Primary Examiner—John J. Love
Assistant Examiner—Donn McGiehan
Attorney, Agent, or Firm—Blakely, Sokoloff, Taylor & Zafman

[57] ABSTRACT

A steering apparatus for a vehicle steers both front and rear wheels and has an electric power steering unit for steering the rear wheels with a rotational force of a motor and a controller for generating a rear wheel steering signal in response to a vehicle speed and a front wheel steering angle. The controller includes a plurality of pattern memories for storing rear wheel steering angles, one of which is read out in response to a detected front wheel steering angle in accordance with ratios of rear wheel steering angles to front wheel steering angles. The ratios are predetermined or given as a function of vehicle speeds.

5 Claims, 17 Drawing Figures

STEERING APPARATUS FOR VEHICLE

BACKGROUND OF THE INVENTION

The present invention relates to a steering apparatus for a four-wheel vehicle such as an automobile, which steers front and rear wheels.

In general, a vehicle can be turned upon steering of the front wheels. If rear wheels are also steered in accordance with a steering angle of the front wheels, stability at high and middle vehicle speeds and response at low vehicle speeds can be improved, as is known to those skilled in the art. Conventional mechanical and hydraulic wheel steering apparatuses for steering both front and rear wheels are respectively exemplified in Japanese Pat. Prepublication Nos. 59-26364 and 59-81261. In the former apparatus, a steering force of the front wheels is transmitted to the rear wheels through an actuating shaft coupling the front wheels to the rear wheels. The latter apparatus has a rear wheel power steering unit using hydraulic pressure as auxiliary power and controls an oil flow in accordance with the steering angle of the front wheels.

The conventional mechanical steering apparatus is bulky, however, so that it is difficult to provide adequate mounting space. In the conventional hydraulic steering apparatus, an oil reservoir is located between a rear wheel drive unit and the apparatus drive unit, and the rear wheels are driven by the hydraulic power. This steering apparatus is also bulky and complicated. In addition, a change in oil temperature adversely affects performance, and a countermeasure against oil leakage is required.

SUMMARY OF THE INVENTION

It is, therefore, a principal object of the present invention to provide a compact steering apparatus.

It is another object of the present invention to provide a steering apparatus free from the influences of oil temperature changes.

It is still another object of the present invention to provide a steering apparatus which does not require oil leakage countermeasure, thus achieving high flexibility in the mounting space.

In order to achieve the above and other objects of the present invention, there is provided a steering apparatus for a vehicle which steers both front and rear wheels, comprising: an electric power steering unit for steering the rear wheels with a rotational force of a motor; and a controller for generating a rear wheel steering signal in response to a vehicle speed and a front wheel steering angle.

DESCRIPTION OF THE PREFERRED EMBODIMENT

Figure 1:
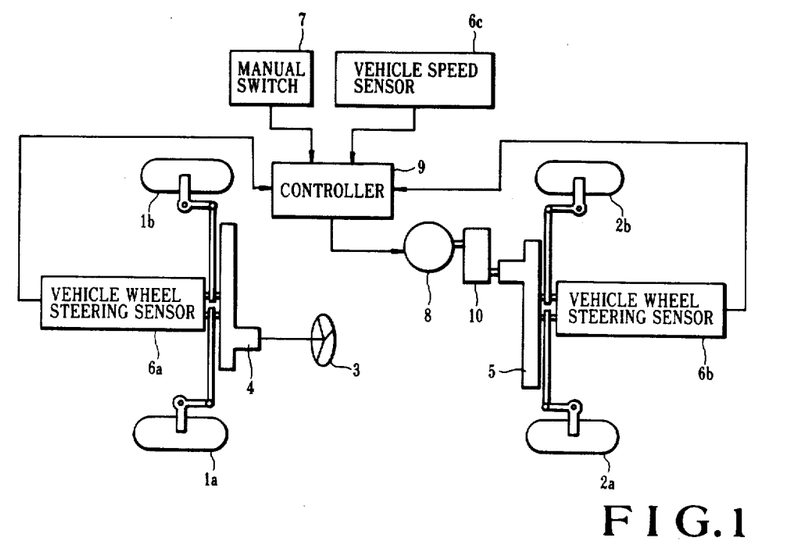
FIG. 1 is a block diagram of a steering apparatus for a vehicle according to an embodiment of the present invention.

FIG. 1 is a block diagram of a steering apparatus for a vehicle according to an embodiment of the present invention. Referring to FIG. 1, reference numerals 1a and 1b denote front wheels; 2a and 2b, rear wheels; 3, a steering wheel; 4 and 5, steering mechanisms each consisting of a rack and a pinion; 6a, a steering sensor for detecting a steering angle of the front wheels; 6b, a steering sensor for detecting a steering angle of the rear wheels; 6c, a vehicle speed sensor; 7, a manual switch for manually setting a steering angle of the rear wheels; 8, a motor unit; 9, a controller for generating a signal for controlling the motor unit 8; and 10, a reduction gear mechanism.

Figure 2:
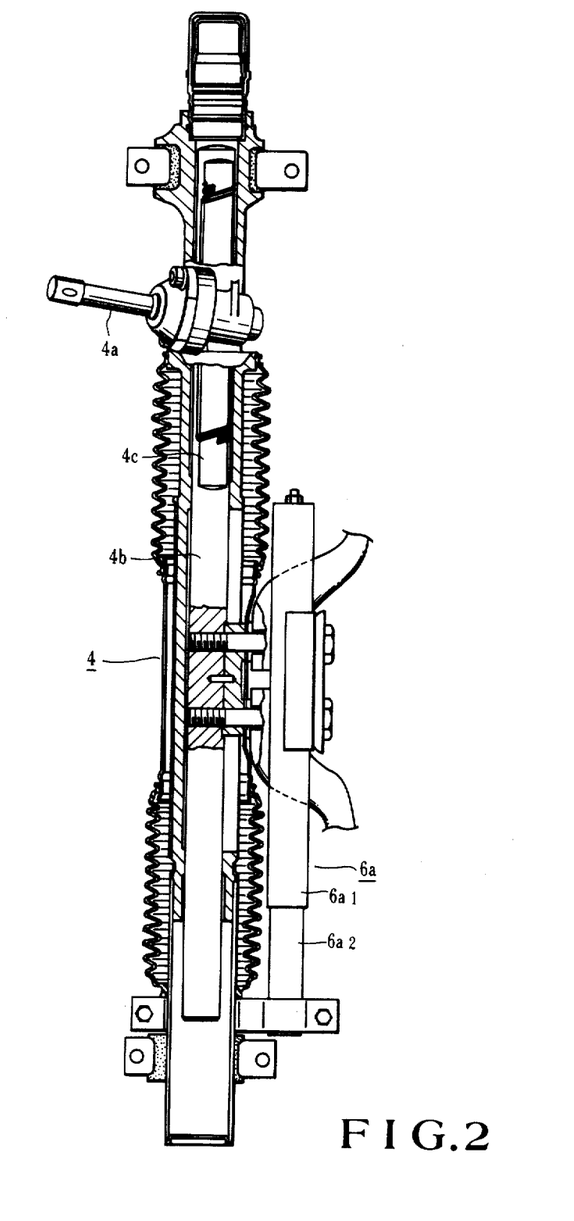
FIGS. 2 and 6 are respectively sectional views of a steering mechanism in the apparatus in FIG. 1.

FIG. 2 is a sectional view showing the positional relationship between the steering mechanism 4 and the steering sensor 6a mounted thereon. Reference numeral 4a denotes a pinion; 4b, a shaft; and 4c, a rack formed at one end of the shaft 4b. The steering sensor 6a is constituted by a differential transformer and is moved together with the shaft 4b. Reference numeral 6a1 denotes a movable portion of the differential transformer; and 6a2, a stationary portion of the differential transformer.

Figure 3:
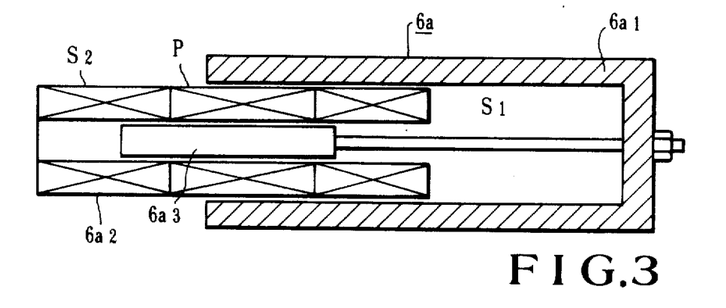
FIG. 3 is a sectional view of a steering sensor in the apparatus of FIG. 1.
Figure 4:
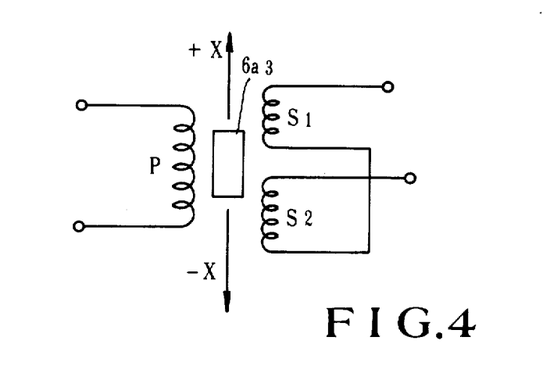
FIG. 4 is a circuit diagram of a differential transformer in the apparatus in FIG. 1.
Figure 5:
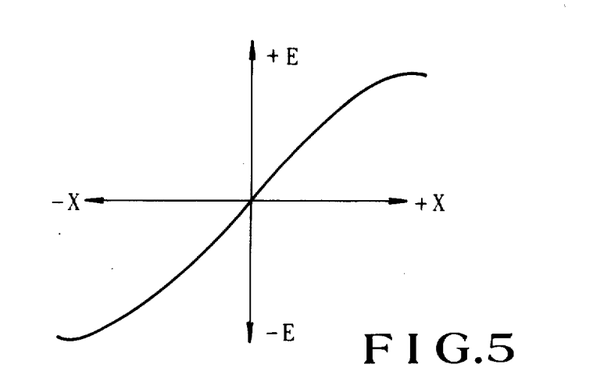
FIG. 5 is a graph showing the characteristics of the differential transformer.

FIG. 3 is a sectional view of the steering sensor 6a. The stationary portion 6a1 is divided into a primary coil P and two secondary coils S1 and S2. A core 6a3 of a magnetic member, integral with the movable portion 6a1, is moved inside the stationary portion 6a2. FIG. 4 is a circuit diagram of the differential transformer, and FIG. 5 is a graph showing the relationship between a displacement X of the core 6a3 and an output voltage E.

Figure 6:
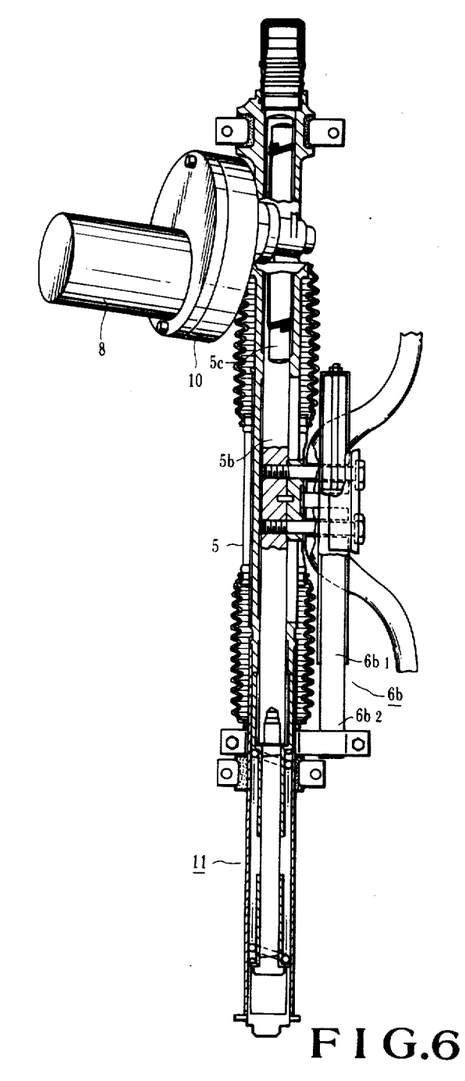

FIG. 6 is a sectional view showing the positional relationship between the steering mechanism 5 and the steering sensor 6b mounted thereon. The assembly in FIG. 6 is substantially the same as that in FIG. 2, except that the pinion 4a is replaced with the motor unit 8 and the reduction gear mechanism 10. A fail safe mechanism 11 is amounted at one end of the steering mechanism 5 for holding the rear wheels 2a and 2b straight when a control function for the rear wheels 2a and 2b fails.

Figure 7:
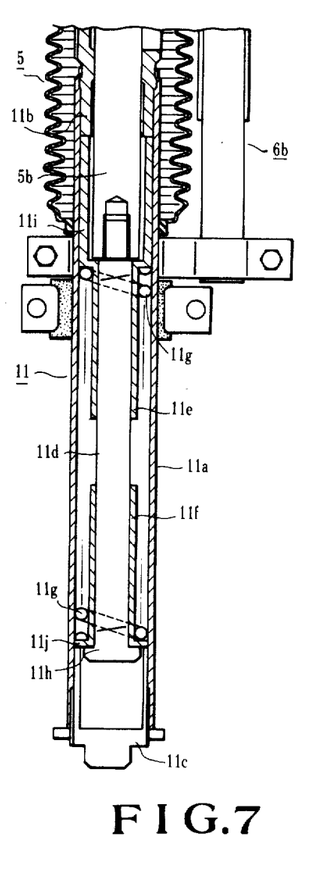
FIG. 7 and FIGS. 12A to 12C are respectively sectional views of a fail safe mechanism in the apparatus in FIG. 1.

The detailed structure of the fail safe mechanism 11 is illustrated in FIG. 7. The fail safe mechanism 11 has a cylindrical case 11a fixed to a vehicle body, a stopper 11b mounted on the left end portion of the case 11a, a stopper 11c mounted on the right end face of the case 11a, a columnar guide 11d, the left end of which is screwed in the shaft 5b of the steering mechanism 5, columnar movable members 11e and 11f slidably mounted on the guide 11d, and a spring 11g mounted on the movable members 11e and 11f.

A hexagonal head 11h with a diameter larger than the diameter of the guide 11d is formed at the right end thereof. The left portion of the movable member 11e is constituted by a step 11i, which is enlarged and an outer diameter of which is substantially the same as that of the inner diameter of the case 11a. The left end of the spring 11g abuts against the right wall of the step 11i.

The right portion of the movable member 11f is constituted by a step 11j, which is enlarged and an outer diameter of which is substantially equal to the inner diameter of the case 11a. The spring 11g abuts against the left wall of the step 11j. The left end of the step 11i abuts against the right end of the stopper 11b by the elastic force of the spring 11g. The right end of the step 11j abuts against the left end of the stopper 11c.

Figure 8:
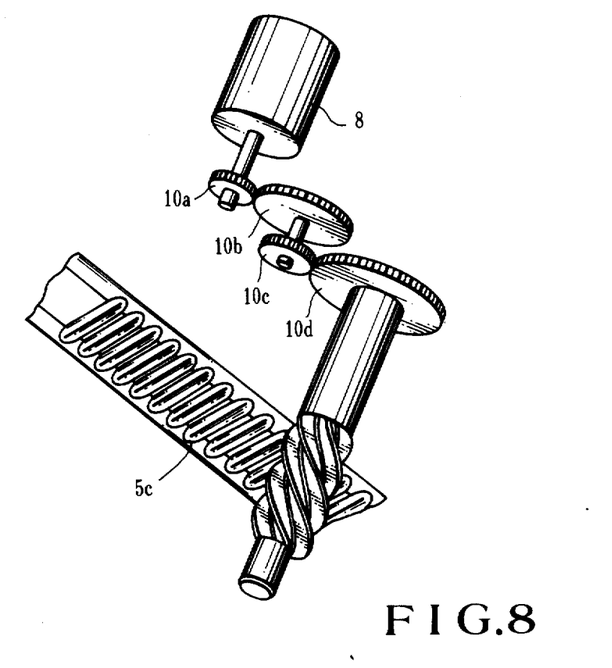
FIG. 8 is a perspective view of a reduction gear mechanism in the apparatus in FIG. 1.

As shown in FIG. 8, the reduction gear mechanism 10 has gears 10a to 10d. The gears 10a to 10d are set such that a ratio of a rotational speed of the motor unit 8 to a gear ratio is given to be about 15:1. A rotational force of the motor unit 8 is transmitted to the rack 5c.

Figures 9, 9A:
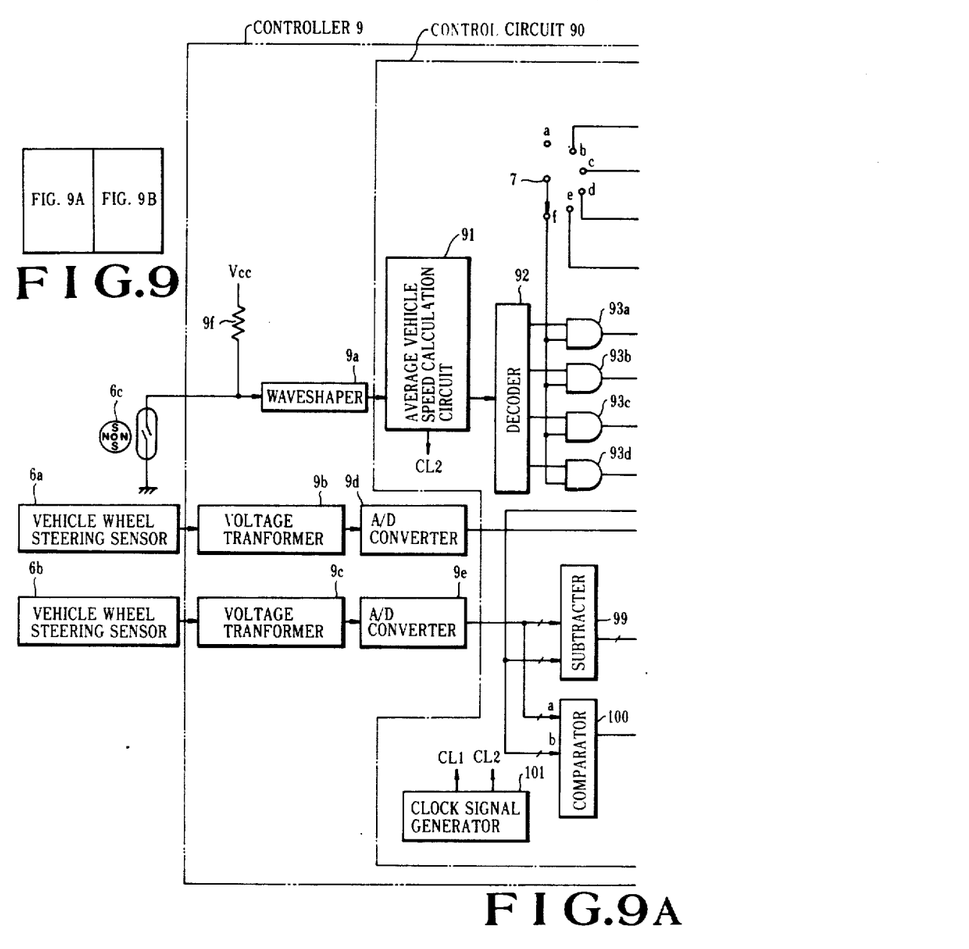
FIG. 9 is a block diagram showing a detailed arrangement of a controller in the apparatus in FIG. 1.
Figure 9B:
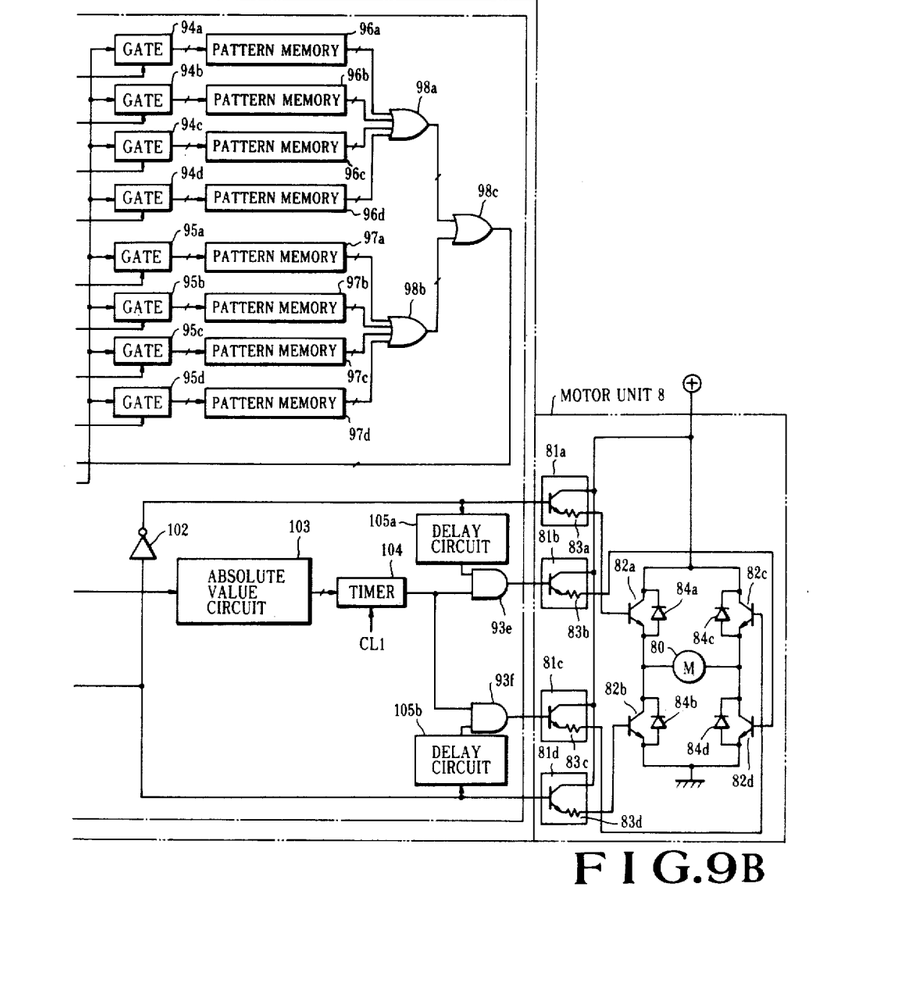

FIG. 9 is a block diagram showing a detailed arrangement of the controller 9 and the motor unit 8. The motor unit 8 comprises a motor 80, transistors 81a to 81d, transistors 82a to 82d, resistors 83a to 83d, and diodes 84a to 84d. The controller 9 comprises an input signal processor and a control circuit 90. The input signal processor consists of a wave shaper 9a, voltage transformers 9b and 9c, A/D converters 9d and 9e, and a resistor 9f. The control circuit 90 includes a microcomputer.

The control circuit 90 has an average vehicle speed calculation circuit 91, a decoder 92, AND gates 93a to 93f, gate circuits 94a to 94d and 95a to 95d, pattern memories 96a to 96d and 97a to 97d, OR gates 98a to 98c, a subtracter 99, a comparator 100, a clock signal generator 101, an inverter 102, an absolute value circuit 103, a timer 104, and delay circuits 105a and 105b.

Figure 10:
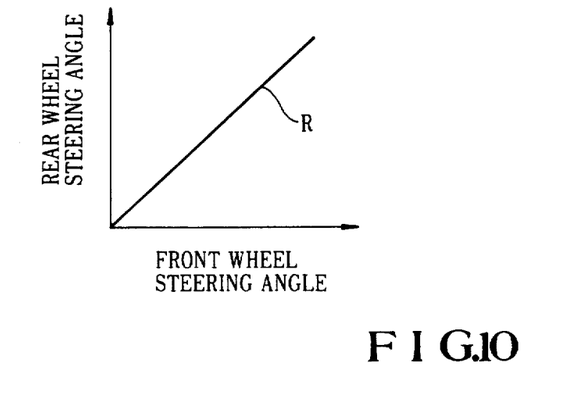
FIGS. 10 and 11 are respectively graphs exemplifying characteristics stored in pattern memories.

The pattern memories 96a to 96d store ratios R of steering angles of the rear wheels to those of the front wheels. As shown in FIG. 10, for example, when a front wheel steering angle is supplied to one of the pattern memories 96a to 96d, a corresponding one of the rear wheel steering angles is read out therefrom. The pattern memories 96a to 96d store data based on characteristics R = 0.1, 0.2, 0.3, and 0.4, which are manually selected.

Figure 11:
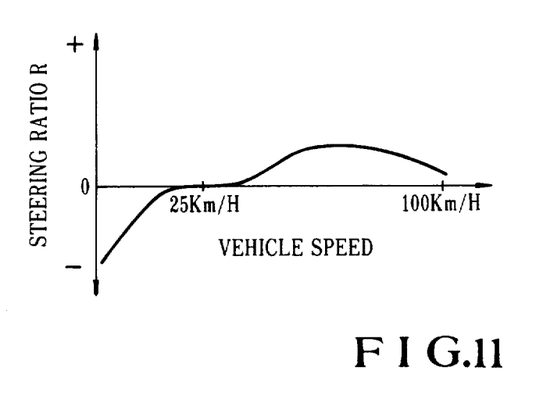

The decoder 92 discriminates vehicle speeds, e.g., vehicle speeds V = 10, 30, 60, and 80 km/H and supplies an ON signal to a corresponding one of the AND gates 93a to 93d, after which the corresponding pattern memories 97a to 97d are automatically selected. In the same operation as in the pattern memories 96a to 96d, when a front wheel steering angle is supplied to one of the pattern memories 97a to 97d, a corresponding rear wheel steering angle is read out. The steering ratio R is a function of the vehicle speed and is determined in accordance with the type of vehicle. As shown in FIG. 11, for example, when the vehicle speed V is about 25 km/H, a flat range (i.e., R = 0) is maintained within a predetermined vehicle speed range. When the vehicle speed is less than a speed falling inside the predetermined vehicle speed range, R is negative, and the steering angle of the front wheels is opposite that of the rear wheels.

The timer 104 generates an output signal in response to each clock signal CL1. The ON time of the output signal is proportional to the magnitude of the input signal. For this reason, a pulse with a duty ratio proportional to the magnitude of the input signal is generated.

When a signal supplied to a terminal a of the comparator 100 is larger than that supplied to a terminal b thereof, the comparator 100 generates a signal of logic "1". Otherwise, the comparator 100 generates a signal of logic "0".

The operation of the steering apparatus having the arrangement described above will be now be described. A vehicle speed signal with pulses the number of which corresponds to a current vehicle speed is generated by the vehicle speed sensor 6c while the vehicle is being driven. The vehicle speed signal is wave-shaped by the wave shaper 9a. The average vehicle speed calculation circuit 91 calculates an average vehicle speed for every period of a clock signal CL2, and the calculated average vehicle speed is then decoded by the decoder 92. When the manual switch 7 is at the position illustrated in FIG. 9, one of the AND gates 93a to 93d which corresponds to the decoded result is turned on.

For example, when the AND gate 93a is turned on, an output therefrom enables the gate 95a. When a driver steers the front wheels 1a and 1b, a voltage corresponding to a steering angle thereof is generated by the steering sensor 6a. This signal is supplied to the pattern memory 97a through the voltage transformer 9b, the A/D converter 9d, and the gate 95a. A rear wheel steering angle determined by the front wheel steering angle is read out from the pattern memory 97a, and this signal is supplied to the subtracter 99 and the comparator 100. In this case, the rear wheels are not steered, so the A/D converter 9e does not generate an output signal. The signal supplied to the subtracter 99 is output without subtraction. The output from the subtracter 99 is supplied to the absolute value circuit 103, and an absolute value output therefrom is supplied to the timer 104. A pulse with a maximum duty ratio is then generated by the timer 104.

Since the rear wheels are not steered, the comparator 100 generates a signal of logic "0". This signal is inverted by the inverter 102, and thus a signal of logic "1" is supplied to the transistor 81a and one input terminal of the AND gate 93e. The transistors 81a and 82a are turned on, and the AND gate 93e is kept on for the pulse output period of the timer 104. While the AND circuit 93e is kept on, the transistors 81b and 82d are kept on, and a current is then supplied to the transistor 82a, the motor 80, and the transistor 82d. As a result, the motor 80 is rotated.

Since the rear wheels are steered upon rotation of the motor 80, a signal representing a rear wheel steering angle is supplied from the steering sensor 6b to the subtracter 99 and the comparator 100 through the voltage converter 9c and the A/D converter 9d. The subtracter 99 also receives a signal which represents a rear wheel steering angle calculated based on the front wheel steering angle. Therefore, when the rear wheel steering angle is increased, the output from the subtracter 99 is decreased.

More specifically, assume that the front wheels are steered through 10° in the right direction, that a rear wheel steering signal is generated upon designation of the subtracter 99, and that rear wheel steering is started. Also assume that a steering ratio of the rear wheels to the front wheels is set to be 0.5. In this case, the rear wheels must be steered through 5° in the right direction. A signal representing steering of the rear wheels through 5° in the right direction is generated by the subtracter 99. When steering of the rear wheels is started and the rear wheels are located at positions steered through 2°, they must be further steered through 3° in the right direction. The signal from the subtracter 99 is updated to a signal representing steering of the rear wheels through 3° in the right direction.

Assume that the front wheels are steered through 10° in the right direction, that the rear wheels are steered through 5° in the right direction, and that the steering ratio R is set to be 0.2. In this case, the rear wheels must be steered through 2°. For this purpose, the subtracter 99 generates a signal for steering the rear wheels through 3° in the left direction and it is performed. Consequently, the rear wheels are steered through 2° in the right direction.

In this manner, the subtracter 99 compares an actual rear wheel steering angle with a target rear wheel steering angle, determined by the vehicle speed and the front wheel steering angle, and generates a signal for controlling the rear wheel steering angle and its direction. The signal from the subtracter 99 is supplied to the timer 104 through the absolute value circuit 103. The timer 104 generates a signal with a small duty ratio when an input signal value is decreased and the rotational speed of the motor 80 is then decreased. When the actual rear wheel steering angle reaches the target value, the output from the subtracter 99 is zero. The timer 104 no longer generates an output, the motor 80 is stopped, and rear wheel steering is completed. The above operation prevents overrun of the rear wheels.

When the vehicle completes turning and the driver turns the steering wheel to the straight position, the front wheels are returned to the straight position, accordingly. The signal representing the rear wheel steering angle is not generated by the OR gate 98c, and the comparator 100 generates a signal of logic "1". In this state, the transistor 81a is turned off, and the transistor 81d is turned on. The AND gate 93e is disabled and the AND gate 93f is enabled. Since the signal corresponding to the rear wheel steering angle is generated by the steering sensor 6b, a pulse with a duty ratio corresponding to the rear wheel steering angle signal is generated by the timer 104, and the motor 80 is driven in response to the signal therefrom. In this case, the direction of current supplied to the motor 80 is reversed, so the rear wheels are returned to the straight position. When the rear wheels are set in the straight position, steering is completed.

The above description has been made for steering in the automatic mode. However, a desired steering angle of the rear wheels can be set when the manual switch 7 is set in one of the positions b to e in FIG. 9. In this case, the rear wheel steering angle is determined according to the front wheel steering angle. For example, if the pattern memory 96a stores rear wheel steering angles, directions of which are opposite to those of the front wheel steering angles, the vehicle can be turned within a small radius. When the switch 7 is set at position a, rear wheel steering is inhibited.

Figure 12A:
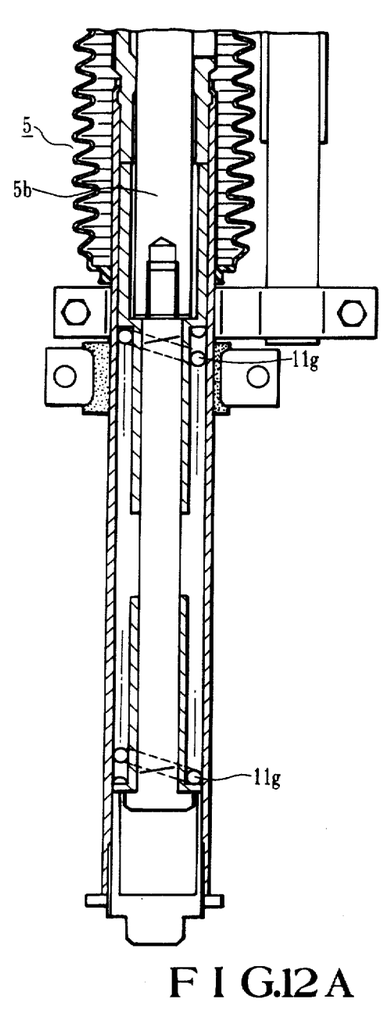
Figure 12B:
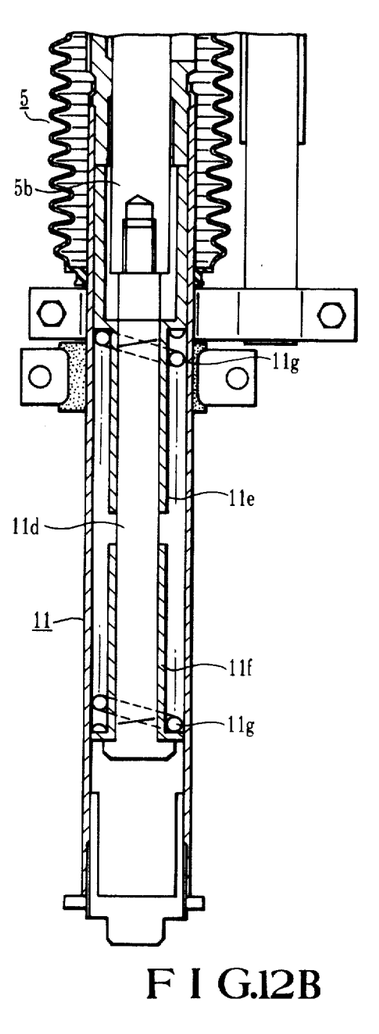
Figure 12C:
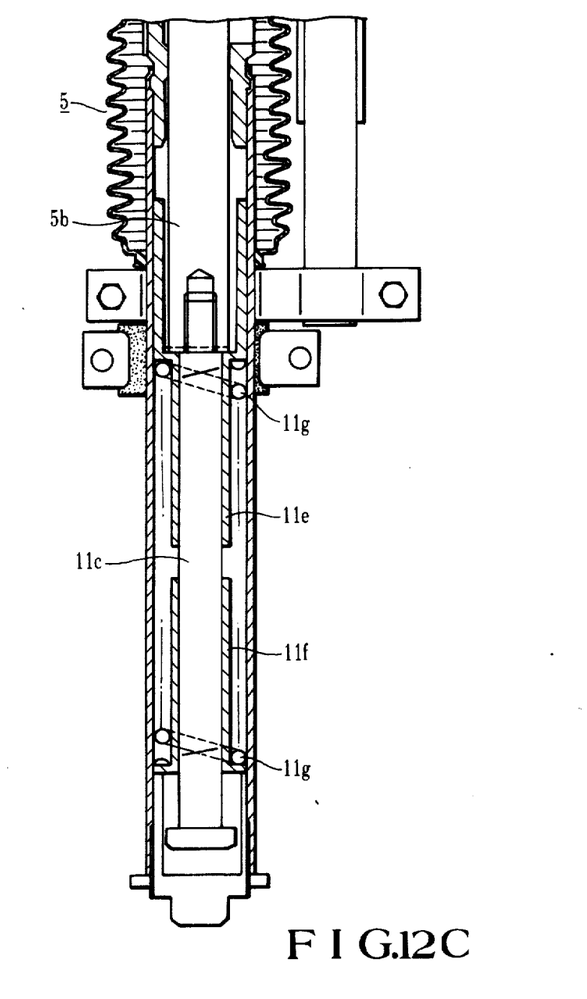

FIGS. 12A to 12C are sectional views showing the operating states of the fail safe mechanism 11. FIG. 12A shows a state wherein the shaft 5b is located at the central position, FIG. 12B shows a state wherein the shaft 5b is moved to the left, and FIG. 12C shows a state wherein the shaft 5b is moved to the right. In the state in FIG. 12B, the guide 11d is moved together with the shaft 5b to the left, so that the movable member 11f is moved to the left. When the left end of the movable member 11f abuts against the right end of the movable member 11e, the movable member 11f is no longer moved to the left. This stop position is the maximum left displacement position of the shaft 5b. FIG. 12C shows a maximum right displacement position of the shaft 5b. When the controller 9 fails at the maximum left or right displacement position in FIGS. 12B or 12C, the guide 11d is returned by a restoration force of the spring 11g to the central position, thus obtaining the state in FIG. 12A.

In the above embodiment, the characteristics in FIG. 11 are stored in the pattern memories 97a to 97d. The steering ratios R must be positive throughout the entire vehicle speed range in accordance with the type of vehicle. In this case, the sign of the steering ratios R within the vehicle speed range does not change. Unlike FIG. 11, a flat region near 25 km/H need not be provided.

Figure 13:
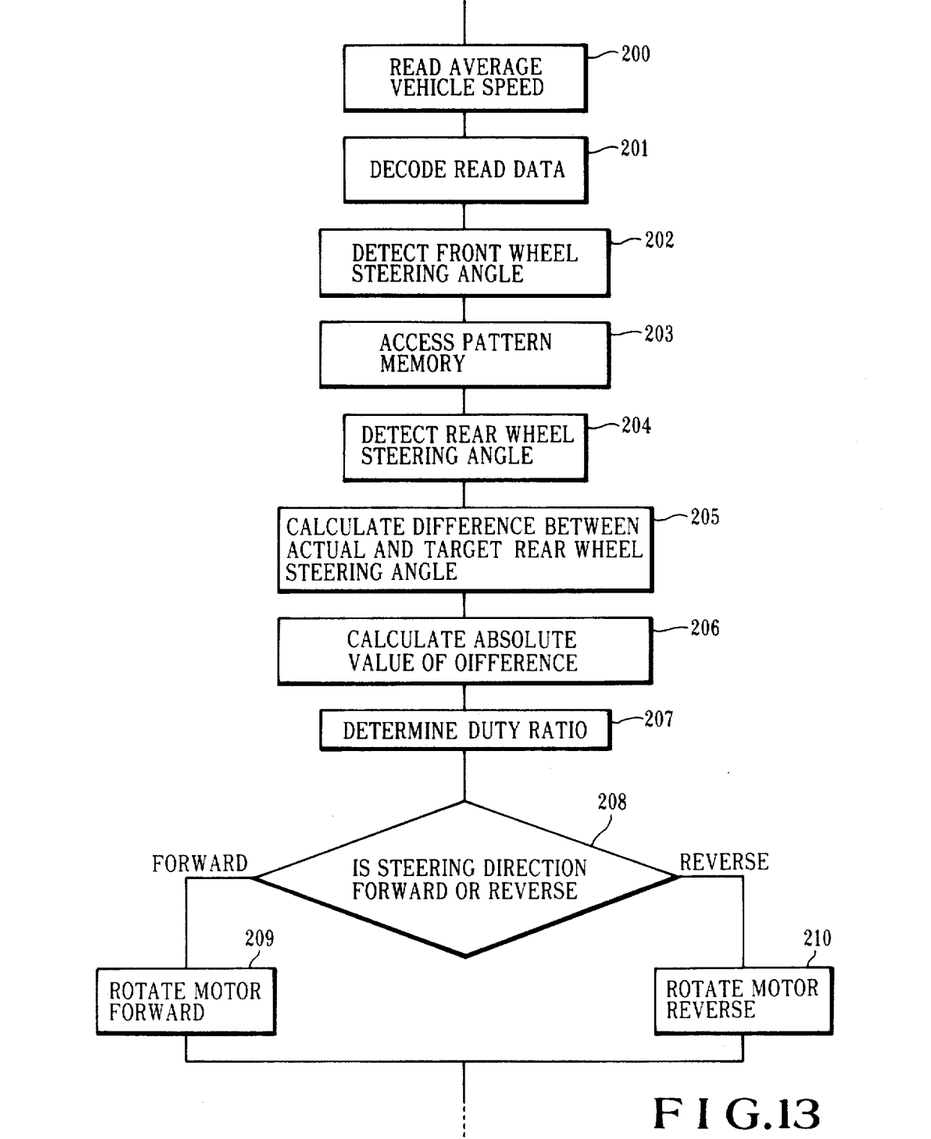
FIG. 13 is a flow chart for explaining control operation of a microcomputer in the apparatus in FIG. 1.

FIG. 13 is a flow chart for explaining the microcomputer steps of controlling the steering operation. The same steps are used in the automatic and manual modes. The steps in FIG. 13 correspond to blocks of FIG. 9, as shown in Table 1.

TABLE 1

| Step | Corresponding Block |
|---|---|
| 200 | Average vehicle speed calculation circuit 91 |
| 201 | Decoder 92, gates 94a to 94d, & gates 95a to 95d |
| 202 | Steering sensor 6a, voltage transformer 9b, & A/D converter 9d |
| 203 | Pattern memories 96a to 97d |
| 204 | Steering sensor 6b, voltage converter 9c, & A/D converter 9e |
| 205 | Subtracter 99 |
| 206 | Absolute value circuit 103 |
| 207 | Timer 104 |
| 208 | Comparator 100 |
| 209, 210 | Inverter 102, transistors 81a to 81d, & transistors 82a to 82d |

According to the present invention described above, the rear wheels are steered by the motor, a drive current of which is determined by the vehicle speed and the front wheel steering angle. The steering apparatus is compact, free from changes in characteristics due to changes in oil temperature and does not require an oil leakage countermeasure. Therefore, mounting flexibility is improved and economical advantages can be obtained.

What is claimed is:

1. A steering apparatus for a vehicle which steers both front and rear wheels, comprising:
    an electric power steering unit for steering the rear wheels with a rotational force of a motor;
    first sensor for sensing a vehicle speed;
    second and third sensors for sensing front and rear wheel steering angles, respectively;
    an input signal processor consisting of a waveshaper for receiving and waveshaping a vehicle speed signal from said first sensor;
    first and second voltage transformers for transforming front and rear wheel steering angle voltages from said second and third sensors, respectively;
    first and second analog to digital converters for converting output signals from said first and second voltage transformers to digital signals representing front and rear steering angles, respectively;
    a control circuit supplied with the vehicle speed signal from said input signal processor and said digital signals representing front and rear steering angles from said first and second analog to digital converters, respectively, to generate and supply a signal for steering said rear wheel to said electric power steering unit, said control circuit including a decoder, a plurality of pattern memories, a subtracter, and a timer.

2. An apparatus according to claim 1, wherein said plurality of pattern memories store rear wheel steering angles, one of which is read out in response to the digital signal from said first A/D converter in accordance with a corresponding one of ratios of rear wheel steering angles to front wheel steering angles, the ratios being a function of the vehicle speeds, one of which is discriminated by said decoder.

3. An apparatus according to claim 1, wherein said plurality of pattern memories store rear wheel steering angles, one of which is read out in response to the digital signal from said first A/D converter in accordance with a corresponding one of predetermined ratios of rear wheel steering angles to front wheel steering angles.

4. An apparatus according to claim 3, further comprising a manual switch for selecting said corresponding one of the predetermined ratios.

5. An apparatus according to claim 1, wherein said subtracter calculates a difference between the digital signal from said second A/D converter and a rear wheel steering angle read out from a corresponding one of said plurality of pattern memories, and said timer generates an output signal an ON time of which corresponds to the difference in response to each clock signal.

* * * * *

UNITED STATES PATENT AND TRADEMARK OFFICE
CERTIFICATE OF CORRECTION

PATENT NO. : 4,645,025
DATED : February 24, 1987
INVENTOR(S) : OHE ET AL.

It is certified that error appears in the above-identified patent and that said Letters Patent is hereby corrected as shown below:

Column 3, line 64, delete "a" (3rd occurrence) and insert -- $\underline{a}$ -- .

Column 3, line 65, delete "b" and insert -- $\underline{b}$ --.

Column 5, line 46, delete "b", "e" and insert -- $\underline{b}$ -- , -- $\underline{e}$ -- .

Column 5, line 52, delete "a" (2nd occurrence) and insert -- $\underline{a}$ -- .

Signed and Sealed this

Fifth Day of July, 1988

Attest:

DONALD J. QUIGG

Attesting Officer

Commissioner of Patents and Trademarks